United States Patent [19]

Panzarino

[11] 3,974,360

[45] Aug. 10, 1976

[54] ELECTRICAL HEATING UNIT INCORPORATING PROTECTIVE PbTiO₃ OVERGLAZE

[75] Inventor: Joseph N. Panzarino, Big Flats, N.Y.

[73] Assignee: Corning Glass Works, Corning, N.Y.

[22] Filed: Sept. 19, 1975

[21] Appl. No.: 614,799

[52] U.S. Cl. .............................. 219/543; 427/125; 338/308
[51] Int. Cl.² ......................................... H05B 3/16
[58] Field of Search ............ 219/464, 543; 427/96, 427/123, 124, 125; 252/514; 338/308, 309

[56] References Cited
UNITED STATES PATENTS

| | | | |
|---|---|---|---|
| 3,067,315 | 12/1962 | Hurko | 219/543 |
| 3,496,336 | 2/1970 | Hingorany et al. | 219/464 |
| 3,679,473 | 7/1972 | Blatchford et al. | 427/96 |
| 3,694,627 | 9/1972 | Blatchford et al. | 219/543 |

Primary Examiner—Volodymyr Y. Mayewsky
Attorney, Agent, or Firm—Kees van der Steere; Clinton S. Janes, Jr.; Clarence R. Patty, Jr.

[57] ABSTRACT

An electrical heating unit of the integral element type, comprising a platinum film heating element bonded to a supporting ceramic plate, wherein the platinum film heating element is electrically stabilized and physically protected by a lead titanate overglaze, is described.

1 Claim, 1 Drawing Figure

U.S. Patent   Aug. 10, 1976   3,974,360
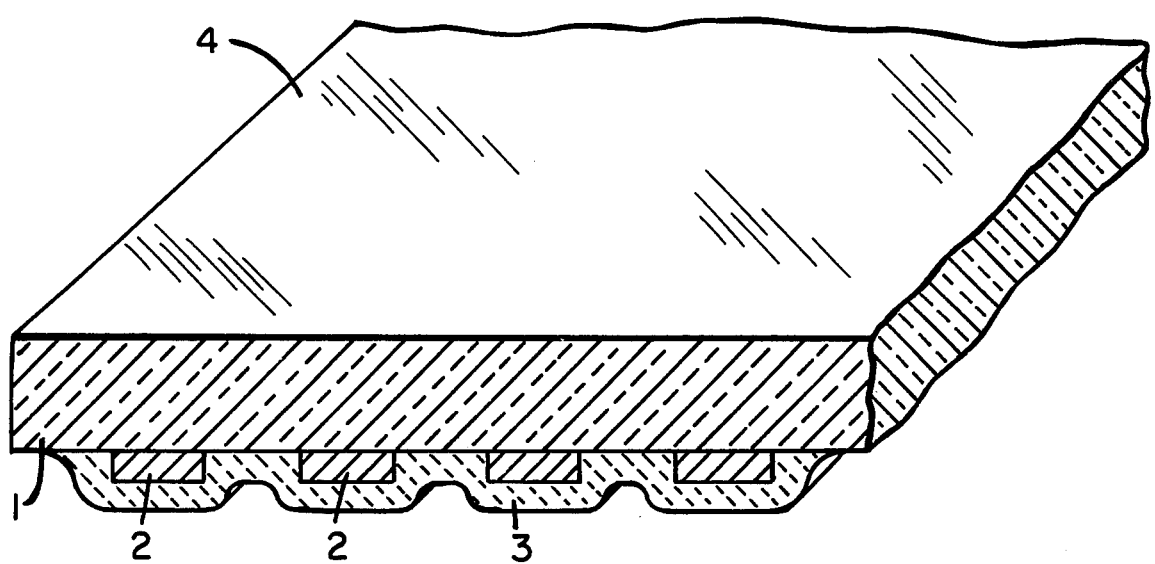

ELECTRICAL HEATING UNIT INCORPORATING PROTECTIVE PBTIO3 OVERGLAZE

BACKGROUND OF THE INVENTION

Electrical heating units comprising noble metal heating elements directly bonded to low expansion glass support plates are known. U.S. Pat. No. 3,067,315 to Hurko, for example, describes a heating unit comprising a low thermal expansion, high-silica glass burner plate to the underside of which is bonded a thin noble metal film. This thin film acts as an electrical heating element to heat the plate and objects supported thereby.

Heating units comprising bonded elements, or so-called integral elements, such as described in the aforementioned patent, offer substantial advantages in heating efficiency over units wherein the heating element is spaced from or merely in close proximity to the support plate. However, life testing of integral element units comprising thin noble metal films bonded to smooth ceramic surfaces has demonstrated that there are stability problems associated with films of the kind typically employed. Operating temperatures for cooking units of the integral element type desirably exceed 600°C. at the ceramic-noble metal interface, leading to problems of cracking, peeling, and agglomeration of the noble metal film. The consequent development of high resistance regions in the film causes local hot spots, arcing, and eventually total failure due to film discontinuities. These problems are encountered even when platinum, one of the more refractory of the readily available element fabrication metals, is employed as the primary element material.

More common than the problem of element failure is the problem of increased element electrical resistance, caused by gradual element deterioration in use, which reduces the heat energy generated by the element to levels below those required for cooking units.

It is the main object of the present invention to provide a method of stabilizing platinum-containing noble metal heating elements, and thus to provide electrical heating units of improved long-term stability.

Other objects and advantages of the invention will become apparent from the following description.

SUMMARY OF THE INVENTION

I have discovered means by which the electrical stability of platinum and platinum-rich thin film electrical heating elements, particularly heating elements bonded to ceramic plates and experiencing use temperatures in excess of 600°C., may be substantially improved. More specifically, I have discovered that the deterioration in resistance characteristics observed in such films following use at such temperatures can be arrested by applying a dense non-porous lead titanate glaze over the films.

The glaze is applied to the film, and to regions of the supporting ceramic surface adjacent thereto, by consolidation and crystallization of $PbO—TiO_2—Al_2O_3—SiO_2$ glass. This glass may be applied to the film and adjacent surface areas, for example, as a glass powder, to provide a coating of the powdered glass on the selected areas. Suitable fugitive vehicle and binder constituents may be utilized to effect the application of the powder, if desired.

After a coating of the glass has been provided, at least the glass and the film are heated to a temperature above the softening point but below the liquidus temperature of the glass, to sinter the glass to a dense, non-porous glassy coating. This heating is continued for a time at least sufficient to crystallize the glass coating, in order to form a lead titanate ($PbTiO_3$) crystal phase therein and thus to provide a non porous lead titanate glaze. The crystallized glaze is refractory, low in thermal expansion, and exhibits good thermal stability.

The resulting electrical heating unit, comprising a ceramic plate, an electrical resistance heating element including a platinum-containing film bonded to the lower surface of the plate, and a dense, non-porous lead titanate glaze bonded to the film and adjacent surface portions of the supporting ceramic, exhibits improved electrical stability in comparison to units of similar configuration, but not comprising a lead titanate glaze over the element.

DESCRIPTION OF THE DRAWING

The DRAWING consists of an oblique partial schematic view in cross-section of an electrical heating unit provided in accordance with the present invention, showing a ceramic plate 1 to the lower surface of which is bonded an electrically-conductive platinum-containing noble metal film 2 which comprises the heating element of the unit. Bonded to film 2 and plate 1 is a non-porous lead titanate glaze 3 which protects film 2 and stabilizes the electrical resistance properties thereof. Upon passing an electrical current through film 2, the unit including upper heating surface 4 is heated to provide a heat source for heating thermal loads in contact with or proximity to surface 4.

DETAILED DESCRIPTION

The ceramic plate utilized to support the heating element of the unit may be composed of any strong, low expansion, thermally stable ceramic material. For the purpose of the present description, the term ceramic plate refers to a glass plate, a glass-ceramic plate, or a plate of a sintered, fuse-cast or batch-fired ceramic material. To provide the thermal durability required for cooking units, the plate preferably has a low average linear coefficient of thermal expansion (typically not exceeding about $20 \times 10^{-7}/°C.$ over the range from 0–800°C.). Particularly preferred plates are glass-ceramic plates such as, for example, may be fabricated in accordance with the teachings of U.S. Pat. Nos. 2,920,971, 3,625,718, or 3,681,097.

The ceramic plate may be a unitary plate of a single composition or it may be of laminated structure, comprising two or more layers of differing composition. It may also incorporate one or more surface coatings provided for the purpose of modifying the surface properties thereof.

The metallic film heating element which is bonded to the ceramic plate must consist at least predominantly of platinum, i.e., the composition of the film must include about 75–100% of platinum by weight. Optional constituents making up the remainder of the film include other noble metals, such as gold, or rhodium, and also sinterable powdered glass bonding agents such as lead silicate, lead borosilicate, or lead titanosilicate glasses. Metallic film heating elements composed largely of metals other than platinum, such as, for example, gold, have not been successfully stabilized with lead titanate glazes in accordance with the present invention.

The metallic film forming the heating element may be applied to the ceramic plate in accordance with conventional techniques, utilizing commercially-available platinum-containing liquid or paste compositions for this purpose. Such compositions typically comprise thermally-decomposable organic noble metal compounds such as carboxylates, napthanates, resinates or admixtures of the noble metals, mixed with organic vehicles or solvents. Minor amounts of powdered glasses are added to such compositions when the presence of a glass bonding agent is desired.

Such compositions are applied to the ceramic plate by painting, silk-screening, or other conventional procedures, and the plate and composition are then fired at an elevated temperature to decompose and/or expel the organic constituents, and to consolidate and bond the metallic and glass constituents to the surface of the plate. Contact terminals providing a convenient means for applying electrical power to the element film may be simultaneously or subsequently bonded directly to the film, if desired.

The electrical stabilization of the element film with a lead titanate glaze in accordance with the present invention is conveniently accomplished by melting a batch for a $PbO$—$TiO_2$—$Al_2O_3$—$SiO_2$ glass, providing a glass powder from the melt by fritting, crushing and grinding, or other suitable method, applying a coating of the glass over the element film and adjacent regions of the ceramic plate and, finally, firing the plate, element and coating to obtain a dense lead titanate glaze over the element.

Suitable $PbO$—$TiO_2$—$Al_2O_3$—$SiO_2$ glass compositions for the production of glass powder, thermally crystallizable to lead titanate glazes consist essentially, in weight percent on the oxide basis, of about 62–68% $PbO$, 12–16% $TiO_2$, 14–20% $SiO_2$, and 2–4% $Al_2O_3$. Such glasses may be provided by compounding batches of these oxides, or other suitable glass batch materials, and melting at temperatures in the range of about 1,200°–1300°C. for about 2 hours.

Glass powders prepared from melts formulated as described can be mixed with volatile or decomposable fugitive liquid vehicles to provide a paste or slurry for convenient application as a coating to the element and adjacent lower plate surfaces. Preferred pastes or slurried for this purpose include glass powders having a maximum average particle size not exceeding about 20 microns, and utilize a medium silk screening oil as a vehicle to provide a composition suitable for silk screen or doctor blade application.

The thickness of the glass coating applied to the element is not critical, but is normally sufficient to provide a fired glaze of at least about 0.5 mils thickness.

Following the application of the coating, the vehicle is removed and the glass is sintered and crystallized by heating above the softening point of the glass and maintaining at an elevated temperature until crystallization is complete. Suitable heat treatments for this purpose comprise heating to a temperature in the range of about 700°–850°C. for ¼–1 hours, such treatments generally being sufficient to obtain essentially complete crystallization of the glaze.

Following heat treatment, the heating unit including the protective lead titanate overglaze is cooled to room temperature and provided with electrical powering and control apparatus suitable for use with an electrical heating unit. The powered unit exhibits heating and control characteristics similar to a unit not having a protective lead titanate glaze over the heating element, but demonstrates significantly improved resistance stability in use.

The invention may be further understood by reference to the following detailed example illustrating the presently preferred procedure for the construction of an electrical heating unit in accordance therewith.

EXAMPLE I

Three zinc aluminosilicate glass-ceramic plates are selected for the application of electrical elements. The surfaces to which the elements are to be applied are provided with a ground finish using a 303 grit abrasive, washed with detergent solution, rinsed with tap water, again rinsed with distilled water, and finally oven-dried to remove all moisture therefrom.

A flowable organometallic composition comprising a thermally-decomposable organic platinum compound, a quantity of powdered glass, and an organic solvent, said composition consisting of about 46% platinum metal, 4% powdered glass, and 50% of organic components and solvents, by weight, is selected to provide electrical heating elements on the plates. Such a composition is commercially available, for example, from Englehard Minerals and Chemicals Corporation, Hanovia Liquid Gold, Murray Hill, New Jersey, 07974, as Hanovia No. 7450.

This organometallic-composition is applied in the configuration of a sinuous strip to the three plates through a 166-mesh silk screen by conventional silk screening techniques. The coated plates are then slowly heated to 600°C. and thereafter plunge fired for 5 minutes at 850°C. to sinter and consolidate the composition to form metallic elements.

An overglaze composition consisting of about 6 parts of powdered $PbO$—$TiO_2$—$Al_2O_3$—$SiO_2$ glass and 4 parts of medium weight silk screening oil by weight is provided. The powdered glass has a maximum average particle size not exceeding about 20 microns and a composition in weight percent, of about 66% $PbO$, 14% $TiO_2$, 17% $SiO_2$, and 3% $Al_2O_3$. This composition is applied over the elements of two of the three glass-ceramic plates, utilizing a 196-mesh silk screen and conventional silk screening techniques. The plates provided with the overglaze composition are placed in a 600°C. oven to remove the screening oil and fired to 800°C. for 5 minutes to sinter and crystallize the powder to a dense non-porous overglaze. This overglaze has a thickness of about 0.5 mils.

The heating elements of each of the three plates are then provided with silver contact terminals utilizing a commercially-available silver paste and conventional techniques, and electrical power at a level of about 20 watts per square inch of heating element area is periodically applied to each element in order to test the electrical stability thereof. This power density is sufficient to produce an element temperature in excess of 600°C. during the powering intervals of the test.

Electrical stability in these elements is reflected by changes in the room temperature electrical resistance of each element during the test. The results of the testing are set forth in the Table below, and include the composition of the element, the electrical resistance of the element at the start of the test, the presence or absence of a protective cover glaze, and the change in electrical resistance of each of the elements, computed from electrical resistance measurements made during the test, as a percent of the original resistance value of each element. Resistance measurements are made at three points during the test, after powering intervals totaling 250 hours, 500 hours, and 1,000 hours.

TABLE

| Element Composition | Initial Electrical Resistance | Cover Glaze | Electrical Resistance Change | | |
|---|---|---|---|---|---|
| | | | 250 hours | 500 hours | 1000 hours |
| Platinum | 30.57 ohms | None | +31% | +39% | +52% |
| Platinum | 26.07 ohms | lead titanate | +1.2% | +1.4% | +9.4% |
| Platinum | 27.18 ohms | lead titanate | +1.4% | +1.5% | +10% |

The substantial effectiveness of the dense cover glaze to stabilize platinum heating elements under the conditions described is evident from this Table.

Of course ceramic supporting plates of compositions and structures other than are shown in the Example could alternatively be employed in the fabrication of heating units as hereinabove described. Similarly other heating element compositions consisting at least predominantly of platinum could be substituted for the platinum element of the Example in order to provide a heating unit of improved physical and electrical stability in accordance with the invention.

I claim:

1. An electrical heating unit comprising:
   a. a ceramic plate having a smooth upper heating surface and a smooth lower surface for supporting an electrical heating element;
   b. an electrical heating element bonded to the lower surface of the ceramic plate, said element including a noble metal film which forms at least one continuous heating strip and consists at least predominantly of platinum;
   c. a dense, non-porous lead titanate glaze bonded to the noble metal film and adjacent portions of the lower surface of the ceramic plate, said glaze consisting essentially, in weight percent on the oxide basis, of about 62–68% PbO, 12–16% $TiO_2$, 14–20% $SiO_2$ and 2–4% $Al_2O_3$.

* * * * *